(12) United States Patent
Walker et al.

(10) Patent No.: US 8,792,555 B2
(45) Date of Patent: Jul. 29, 2014

(54) METHODS AND SYSTEMS FOR RESIZING MULTIMEDIA CONTENT

(75) Inventors: Gordon Kent Walker, Poway, CA (US); Vijayalakshmi R. Raveendran, San Diego, CA (US); Binita Gupta, San Diego, CA (US); Phanikumar Bhamidipati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1432 days.

(21) Appl. No.: 11/668,828

(22) Filed: Jan. 30, 2007

(65) Prior Publication Data

US 2008/0037624 A1  Feb. 14, 2008

Related U.S. Application Data

(60) Provisional application No. 60/763,995, filed on Jan. 31, 2006.

(51) Int. Cl.
  *H04N 7/12* (2006.01)
  *H04N 11/02* (2006.01)
(52) U.S. Cl.
  USPC ................................................. 375/240.16
(58) Field of Classification Search
  USPC ....................................... 375/240.16, 240.06
  See application file for complete search history.

(56) References Cited

U.S. PATENT DOCUMENTS

| | | | |
|---|---|---|---|
| 5,426,463 A | 6/1995 | Reininger et al. | |
| 5,764,632 A | 6/1998 | Ylitervo | |
| 5,844,613 A * | 12/1998 | Chaddha | 375/240.12 |
| 5,854,658 A | 12/1998 | Uz et al. | |
| 6,038,256 A | 3/2000 | Linzer et al. | |
| 6,091,777 A * | 7/2000 | Guetz et al. | 375/240.11 |
| 6,185,253 B1 | 2/2001 | Pauls | |
| 6,243,495 B1 * | 6/2001 | Naveen et al. | 382/236 |
| 6,256,423 B1 | 7/2001 | Krishnamurthy et al. | |
| 6,310,915 B1 * | 10/2001 | Wells et al. | 375/240.03 |
| 6,526,031 B1 | 2/2003 | Zaff et al. | |
| 6,539,124 B2 * | 3/2003 | Sethuraman et al. | 382/251 |
| 6,560,231 B1 | 5/2003 | Kawakami et al. | |
| 6,574,279 B1 | 6/2003 | Vetro et al. | |

(Continued)

FOREIGN PATENT DOCUMENTS

| | | |
|---|---|---|
| CN | 1492685 A | 4/2004 |
| CN | 1555612 A | 12/2004 |

(Continued)

OTHER PUBLICATIONS

ISR—PCT/US2007/061418; dated Mar. 8, 2007.

(Continued)

*Primary Examiner* — Zachary A Davis
(74) *Attorney, Agent, or Firm* — Fulbright & Jaworski LLP (57) ABSTRACT

This disclosure describes techniques for resizing multimedia content for efficient statistical multiplexing. In response to a request to resize a current segment of data, an encoding module associated with the selected segment adjusts the amount of motion information to be encoded to resize the segment of data. For example, the encoding module associated with the selected segment of data may merge two or more motion vectors to reduce the amount of motion information to be encoded. As another example, the encoding module reselects encoding modes for one or more blocks of pixels of at least one frame within the segment of data.

53 Claims, 5 Drawing Sheets

(56) References Cited

U.S. PATENT DOCUMENTS

| | | |
|---|---|---|
| 6,674,796 B1 | 1/2004 | Haskell et al. |
| 6,704,281 B1 | 3/2004 | Hourunranta et al. |
| 6,744,743 B2 | 6/2004 | Walton et al. |
| 6,959,042 B1 * | 10/2005 | Liu et al. ................ 375/240.02 |
| 7,023,915 B2 | 4/2006 | Pian et al. |
| 7,024,480 B2 | 4/2006 | Weik |
| 7,042,856 B2 | 5/2006 | Walton et al. |
| 7,095,754 B2 | 8/2006 | Benveniste |
| 7,180,905 B2 | 2/2007 | Benveniste |
| 7,245,605 B2 | 7/2007 | Benveniste |
| 7,248,600 B2 | 7/2007 | Benveniste |
| 7,272,181 B2 | 9/2007 | Bayazit |
| 7,277,415 B2 | 10/2007 | Benveniste |
| 7,280,517 B2 | 10/2007 | Benveniste |
| 7,400,642 B2 | 7/2008 | Koo et al. |
| 7,406,202 B2 | 7/2008 | Kodama et al. |
| 7,415,241 B2 | 8/2008 | Oprescu-Surcobe et al. |
| 7,571,246 B2 | 8/2009 | Virdi et al. |
| 7,623,458 B2 | 11/2009 | Ayyagari et al. |
| 7,653,085 B2 | 1/2010 | Dahl et al. |
| 7,659,907 B1 | 2/2010 | Chalfin et al. |
| 7,746,836 B2 * | 6/2010 | Jentz et al. .................... 370/338 |
| 7,835,437 B1 * | 11/2010 | Zhang et al. ............ 375/240.03 |
| 7,876,821 B2 * | 1/2011 | Li et al. .................... 375/240.12 |
| 7,913,277 B1 * | 3/2011 | Rahrer ............................. 725/36 |
| 7,936,818 B2 * | 5/2011 | Jayant et al. ............ 375/240.05 |
| 7,974,193 B2 | 7/2011 | Raveendran et al. |
| 8,351,513 B2 * | 1/2013 | Wen et al. ................ 375/240.24 |
| 2002/0056005 A1 | 5/2002 | Weik |
| 2002/0101832 A1 | 8/2002 | Chen et al. |
| 2002/0137535 A1 | 9/2002 | Hunzinger |
| 2002/0141357 A1 | 10/2002 | Park et al. |
| 2002/0142772 A1 | 10/2002 | Hunzinger |
| 2003/0040315 A1 | 2/2003 | Khaleghi et al. |
| 2003/0053416 A1 | 3/2003 | Ribas-Corbera et al. |
| 2003/0083093 A1 | 5/2003 | Yun et al. |
| 2003/0093515 A1 | 5/2003 | Kauffman |
| 2003/0110297 A1 * | 6/2003 | Tabatabai et al. ............. 709/246 |
| 2003/0112366 A1 | 6/2003 | Baylon et al. |
| 2003/0123413 A1 | 7/2003 | Moon et al. |
| 2003/0185369 A1 | 10/2003 | Oliver et al. |
| 2004/0013102 A1 | 1/2004 | Fong et al. |
| 2004/0013103 A1 | 1/2004 | Zhang et al. |
| 2004/0028139 A1 | 2/2004 | Zaccarin et al. |
| 2004/0042438 A1 | 3/2004 | Jiang et al. |
| 2004/0087331 A1 | 5/2004 | Hwang et al. |
| 2004/0114817 A1 | 6/2004 | Jayant et al. |
| 2004/0165783 A1 | 8/2004 | Reynolds et al. |
| 2004/0213466 A1 | 10/2004 | Kodama et al. |
| 2004/0220966 A1 | 11/2004 | Ridge |
| 2005/0058058 A1 | 3/2005 | Cho et al. |
| 2005/0063330 A1 | 3/2005 | Lee et al. |
| 2005/0078759 A1 | 4/2005 | Zhang |
| 2005/0110188 A1 | 5/2005 | Rausch et al. |
| 2005/0120128 A1 | 6/2005 | Willes et al. |
| 2005/0210515 A1 | 9/2005 | Roh et al. |
| 2005/0220188 A1 | 10/2005 | Wang |
| 2005/0223013 A1 | 10/2005 | Jarman et al. |
| 2005/0282571 A1 | 12/2005 | Oprescu-Surcobe et al. |
| 2005/0286631 A1 | 12/2005 | Wu et al. |
| 2006/0013298 A1 | 1/2006 | Tong et al. |
| 2006/0171460 A1 | 8/2006 | Masuda et al. |
| 2006/0262750 A1 | 11/2006 | Walton et al. |
| 2007/0076599 A1 | 4/2007 | Ayyagari et al. |
| 2007/0201388 A1 | 8/2007 | Shah et al. |
| 2007/0204067 A1 | 8/2007 | Walker et al. |
| 2007/0274340 A1 | 11/2007 | Raveendran et al. |
| 2008/0037420 A1 | 2/2008 | Tang |
| 2008/0037624 A1 | 2/2008 | Walker et al. |
| 2008/0152003 A1 * | 6/2008 | Oguz ........................ 375/240.12 |
| 2011/0299587 A1 | 12/2011 | Raveendran et al. |

FOREIGN PATENT DOCUMENTS

| | | |
|---|---|---|
| EP | 0759667 A2 | 2/1997 |
| EP | 1014632 A2 | 6/2000 |
| EP | 10161522 A2 | 12/2000 |
| EP | 1168731 | 1/2002 |
| EP | 1395039 | 3/2004 |
| EP | 1443511 | 8/2004 |
| JP | 8018976 A | 1/1996 |
| JP | 9233475 A | 9/1997 |
| JP | 10276439 A | 10/1998 |
| JP | 2000031964 | 1/2000 |
| JP | 2000092471 A | 3/2000 |
| JP | 2000324498 A | 11/2000 |
| JP | 2001136139 A | 5/2001 |
| JP | 2002010260 A | 1/2002 |
| JP | 2003046582 A | 2/2003 |
| JP | 2004248144 A | 9/2004 |
| JP | 2004349855 A | 12/2004 |
| JP | 2005167514 A | 6/2005 |
| JP | 2006014288 A | 1/2006 |
| KR | 1019990077445 | 10/1999 |
| KR | 1020000049059 | 7/2000 |
| WO | WO 00/08891 A1 | 2/2000 |
| WO | 0147283 | 6/2001 |
| WO | 0207447 | 1/2002 |
| WO | WO02082743 A2 | 10/2002 |
| WO | WO2004023743 A2 | 3/2004 |
| WO | WO2006099082 A2 | 9/2006 |
| WO | WO2006110876 A2 | 10/2006 |
| WO | WO 2007035238 A2 * | 3/2007 |
| WO | WO2007090176 | 8/2007 |

OTHER PUBLICATIONS

ISR—PCT/US2007/061419, dated Mar. 8, 2007.

Jia Zhike, et al., "Adaptive quantization scheme for very low bit rate video coding" Fifth Asia-Pacific Confernece on Communications and Fourth Optoelectronics and Communications Conference. APCC/OECC' 99; vol. 2, 1999, pp. 940-943.

ISR—PCT/US2007/061416, dated Dec. 12, 2007.

Nakajima, T. et al. "Continuous media storage system supporting VBR streams." Real Time Computing Systems and Applications, 1996. Proceedings, 3rd International Workshop on Seoul, S. Korea. Oct. 30-Nov. 1, 1996. Los Alamitos, CA, IEEE Computer. Soc. US. Oct. 30, 1996, pp. 26-33.

3rd Generation Partnership Project (3GPP), "Physical Layer Standard for CDMA 2000 Spread Spectrum Systems", Doc. No. 3GPP2 C.S0002-C, Release C, Version 1.0, Dated May 28, 2002.

R. Thomas Derryberry et al, "Overview of CDMA2000, Revision D", May 28, 2002, XP-002311845.

TIA-1099, Forward Link Only Air Interface Specification for Terrestrial Mobile Multimedia Multicast, Oct. 2006.

Written Opinion—PCT/US2007/061418—ISA/EPO—Aug. 3, 2007.

Zheng, B. et al., "TSFD: Two stage frame dropping for scalable video transmission over data networks"—2001 IEEE Workshop on High Performance Switching and Routing, May 29-31, 2001, pp. 43-47.

Zhang X., et al., "Constant-Quality Constrained-Rate Allocation For FGS Video Bitstreams," Proceedings of SPIE Conference on Visual Communications and Image Processing (VCIP), Jan. 2002, pp. 817-827, vol. 4671.

* cited by examiner

METHODS AND SYSTEMS FOR RESIZING MULTIMEDIA CONTENT

This application claims the benefit of U.S. Provisional Application No. 60/763,995, filed Jan. 31, 2006, and entitled "MULTIMEDIA CONTENT RE/ENCODING AND STATISTICAL MULTIPLEXING", the entire content of which is incorporated herein by reference.

TECHNICAL FIELD

The disclosure relates to multimedia encoding and decoding and, more particularly, multimedia resizing for efficient statistical multiplexing.

BACKGROUND

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

Content delivery/media distribution systems may pack real time and non real time services into a transmission frame and deliver the frame to devices on a network. For example, a communication network may utilize Orthogonal Frequency Division Multiplexing (OFDM) to provide communications between a network server and one or more mobile devices. This technology provides a transmission frame having data slots that are packed with services to be delivered and transmitted over a distribution network.

SUMMARY

In general, this disclosure describes techniques for resizing multimedia content for efficient statistical multiplexing. More specifically, in response to a request to resize a segment of data, an encoding module resizes the segment of data to reduce the bit rate of the segment of data. The term "bit rate" as used herein, refers to the number of bits used per unit of time to represent the segment of multimedia data. Often bit rate is specified in kilobits per second (kbits/s). Thus, the bit rate of the segment of data corresponds to the size of the segment of data. Therefore reducing the bit rate of the segment of data reduces the size of the segment of data.

In accordance with the techniques of this disclosure, the encoding module may resize the segment of data by adjusting the amount of motion information to be encoded. For example, the encoding module may reduce the amount of motion information that is to be encoded. In other words, the encoding module associated with the segment of data to be resized uses a fewer number of bits to encode the motion information, thus reducing the size of the segment of data. In one aspect of this disclosure, the encoding module associated with the selected segment of data may merge two or more motion vectors. As another example, the encoding module may reselect an encoding mode for one or more blocks of pixels of at least one frame within the segment of data to reduce the amount of motion information to be encoded. In addition to adjusting the amount of motion information to be encoded, the encoding module may also adjust one or more encoding variables, such as a bit rate at which the segment of data is re-encoded or a quantization parameter used for re-encoding the segment of data, to further reduce the bit rate of the segment of data.

In one aspect, a method for encoding streams of multimedia data comprises receiving a request to resize a segment of data associated with the stream of digital multimedia data and resizing the segment of data by adjusting an amount of motion information to be encoded for the segment of data in response to the request.

In another aspect, an apparatus for encoding a stream of digital multimedia data comprises an interface that receives a request to resize a segment of data associated with the stream of digital multimedia data and a resizing module that resizes the segment of data by adjusting an amount of motion information to be encoded for the segment of data in response to the request.

In a further aspect, an apparatus for encoding a stream of digital multimedia data comprises means for receiving a request to resize a segment of data associated with the stream of digital multimedia data and means for resizing the segment of data by adjusting an amount of motion information to be encoded for the segment of data in response to the request.

In another aspect, a processor for processing digital video data is adapted to receive a request to resize a segment of data associated with the stream of digital multimedia data and resize the segment of data by adjusting an amount of motion information to be encoded for the segment of data in response to the request.

The techniques described herein may be implemented in hardware, software, firmware, or any combination thereof. If implemented in software, the techniques may be realized in whole or in part by a computer program product including a computer readable medium comprising instructions that, when executed by a processor, performs one or more of the methods described herein. Accordingly, this disclosure also contemplates a computer-program product for processing digital video data that comprises a computer readable medium comprising instructions that cause at least one computer to receive a request to resize a segment of data associated with the stream of digital multimedia data and resize the segment of data by adjusting an amount of motion information to be encoded for the segment of data in response to the request.

The details of one or more aspects are set forth in the accompanying drawings and the description below. Other features, objects, and advantages of this disclosure will be apparent from the description and drawings, and from the claims.

DETAILED DESCRIPTION

In general, this disclosure describes techniques for resizing multimedia content for efficient statistical multiplexing. More specifically, in response to a request to resize a segment of data, an encoding module resizes the segment of data to reduce the bit rate of the segment of data. The term "bit rate" as used herein, refers to the number of bits used per unit of time to represent the segment of multimedia data. Often bit rate is specified in kilobits per second (kbits/s). Thus, the bit rate of the segment of data corresponds to the size of the segment of data. Therefore reducing the bit rate of the segment of data reduces the size of the segment of data.

In accordance with the techniques of this disclosure, the encoding module may resize the segment of data by adjusting the amount of motion information to be encoded. For example, the encoding module may reduce the amount of motion information that is to be encoded. In other words, the encoding module associated with the segment of data to be resized uses a fewer number of bits to encode the motion information, thus reducing the size of the segment of data. In one aspect of this disclosure, the encoding module associated with the selected segment of data may merge two or more motion vectors. As another example, the encoding module may reselect an encoding mode for one or more blocks of pixels of at least one frame within the segment of data to reduce the amount of motion information to be encoded. In addition to adjusting the amount of motion information to be encoded, the encoding module may also adjust one or more encoding variables, such as a bit rate at which the segment of data is re-encoded or a quantization parameter used for re-encoding the segment of data, to further reduce the bit rate of the segment of data.

Figure 1:
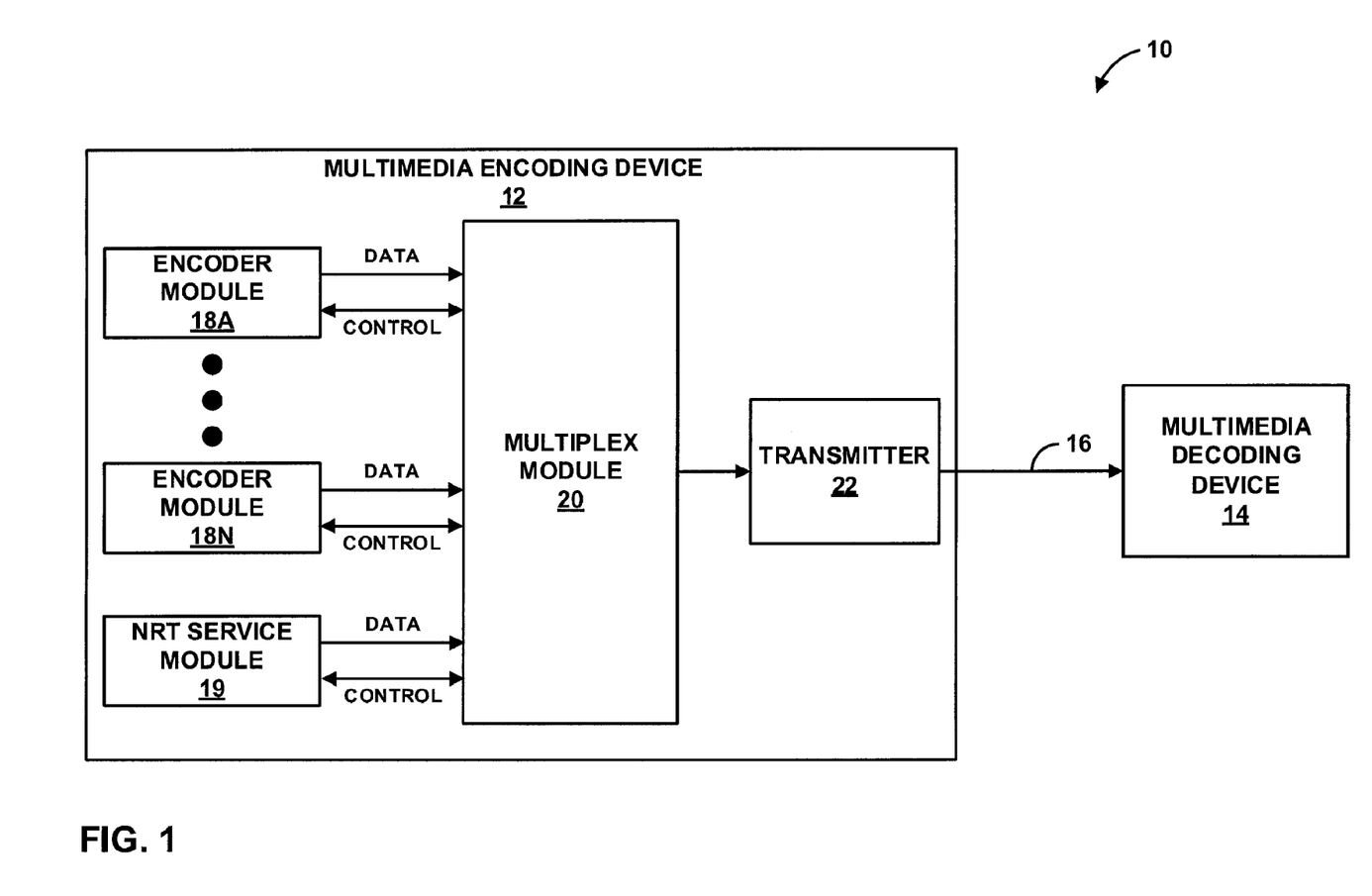
FIG. 1 is a block diagram illustrating an exemplary encoding and decoding system.

FIG. 1 is a block diagram illustrating an exemplary encoding and decoding system 10. Encoding and decoding system 10 includes a multimedia encoding device 12 and a multimedia decoding device 14. Multimedia encoding device 12 encodes multimedia data, combines the encoded data and transmits the combined data to multimedia decoding device 14 via a transmission channel 16. Multimedia encoding device 12 may form part of a broadcast network component used to broadcast one or more channels of multimedia data. Multimedia encoding device 12 may, for example, form part of a wireless base station, server, or any infrastructure node that is used to broadcast one or more channels of encoded multimedia data to one or more wireless devices, such as multimedia decoding device 14.

Multimedia encoding device 12 may encode a plurality of services that include one or more flows of multimedia data, combine the encoded flows and transmit the combined flows to a multimedia decoding device via a transmission channel 16. The services may include both real-time and non-real-time multimedia content or service such as news, sports, weather, financial information, movies, and/or applications, programs, scripts, electronic mail, file transfer or any other type of suitable content or service. In one aspect of this disclosure, multimedia encoding device 12 encodes, combines, and transmits portions of the flows of data received over a period of time. As an example, multimedia encoding device 12 may operate on the flows on a per second basis. In other words, multimedia encoding device 12 encodes one-second segments of data of the plurality of flows, combines the one-second segments of data to form a superframe of data, and transmits the superframe over transmission channel 16 via a transmitter 22. As used herein, the term "superframe" refers to a group of segments of data collected over a predetermined time period or window, such as a one second time period or window. The segments of data include one or more frames of data. Although the techniques of this disclosure are described in the context of one-second segments of data, the techniques may also be utilized for combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time periods.

Multimedia decoding device 14 may comprise a user-device that receives the encoded multimedia data transmitted by multimedia encoding device 12. By way of example, decoding device 14 may be implemented as part of a digital television, a wireless communication device, a portable digital assistant (PDA), a laptop computer or desktop computer, a digital music and video device, such as those sold under the trademark "iPod," or a radiotelephone such as cellular, satellite or terrestrial-based radiotelephone. Although only a single multimedia decoding device 14 is illustrated in FIG. 1 for simplicity, multimedia encoding device 12 may transmit the combined flows of data to more than one multimedia decoding device.

Transmission channel 16 may comprise any wired or wireless medium, or combination thereof. In one aspect, transmission channel 16 is a fixed bandwidth channel. In other words, the amount of transmission channel resources available for transmitting the combined flows of data is limited. Thus, the number of bits of data that multimedia encoding device 12 may transmit via transmission channel 16 is limited by the amount of transmission channel resources available for transmission. In the wireless context, for example, the number of bits of data that multimedia encoding device 12 may transmit via transmission channel 16 is limited by the amount of airlink or air-interface resources available. Transmission channel 16 may comprise one or more radio access technologies, such as global system for mobile communications (GSM), code division multiple access (CMDA), CDMA 2000, wideband CDMA (W-CDMA), CDMA 1x Evolution-Data Optimized (EV-DO), frequency division multiple access (FDMA), time division multiple access (TDMA) or the broad family of standards developed to facilitate wireless networking defined by the various IEEE 801.11x standards.

Multimedia encoding device 12 may attempt to output each of the flows of data at a constant quality level or bit rate. The techniques described herein are applicable in either context. In the case of trying to maintain a constant quality, for example, multimedia encoding device 12 selects a bit rate for the flows of data based on a target quality level. The target quality level used to determine the bit rate can be pre-selected, selected by a user, selected through an automatic process or a semi-automatic process requiring an input from a user or from another process, or selected dynamically by the encoding device or system based on predetermined criteria. A target quality level can be selected based on, for example, the type of encoding application, or the type of client device that would be receiving the multimedia data. If the number of bits necessary to output each of the flows of data at the target quality level exceeds the amount of bits for which there is available transmission channel resources, multimedia encoding device 12 manages bit allocation among the flows in an attempt to preserve the highest overall quality for the plurality of flows.

As shown in FIG. 1, multimedia encoding device 12 includes encoder modules 18A-18N (collectively, "encoder modules 18"), a non-real-time (NRT) service module 19, a multiplex module 20 and a transmitter 22. Encoder modules 18 receive flows of digital multimedia data from one or more sources. Encoder modules 18 may, for example, receive the flows of multimedia data from a memory or an image capture device coupled to encoder modules 18. The flows of multimedia data may comprise live real-time video, audio, or video and audio flows to be coded and transmitted as a broadcast or on-demand, or may comprise pre-recorded and stored video, audio, or video and audio flows to be coded and transmitted as a broadcast or on-demand.

Encoder modules 18 send delivery requirements, such as quality and rate information associated with the real-time services of encoder modules 18, associated with the segments of data to multiplex module 20. NRT service module 19 may also send delivery requirements, such as priority and latency requirements, associated with NRT services. Encoder modules 18 and NRT service module 19 may send the delivery requirements to multiplex module 20 in response to a request from multiplex module 20. Encoder modules 18 and NRT service module 19 may communicate with multiplex module 20 using one or more control channels in accordance with a number of different communication protocols. In one aspect, multiplex modules 20 may communicate using protocols that utilize the message transport layer (MTL) as the underlying transport mechanism.

Multiplex module 20 analyzes the delivery requirements, e.g., the quality and rate information, priority requirements and latency requirements, to determine whether there are sufficient transmission channel resources to transmit the segments of data that encoder modules 18 desire to include in the current superframe. In other words, multiplex module 20 determines whether the segments of data that encoder modules 18 and NRT service module 19 desires to include in the current superframe fit within the fixed bandwidth channel.

Multiplex module 20 may, for example, determine an amount of transmission channel resources necessary to send each of the segments of data at the sizes and/or bit rates corresponding to a selected one of the quality levels. Multiplex module 20 may sum the amounts of transmission channel resources necessary to send the segments of data and compare the sum total of transmission channel resources required by all the segments of data with an amount of available transmission channel resources to determine whether there are sufficient transmission channel resources to send the segments of data. If multiplex module 20 determines that the plurality of segments of data do not fit within the available bandwidth, e.g., the sum total of necessary transmission channel resources exceeds the available transmission channel resources, multiplex module 20 selects one or more of the segments to be resized. Multiplex module 20 may attempt to select the segments of data to be resized that have a least amount of impact in quality at the corresponding reduced size.

Multiplex module 20 sends a request to encoder modules 18 associated with the selected segments of data to resize the flows of digital multimedia data in accordance with the reduced bit allocation or reduced bit rate. Additionally, multiplex module 20 may send a request to NRT module 19 to resize one or more of the NRT services. Multiplex module 20 may send a resize request to the encoder modules 18 and NRT module 19 associated with the selected segments via the control channel. The resize request may specify a maximum size, e.g., in bits, for the selected segment of data or a reduced bit rate for the segment of data.

Encoder modules 18 associated with the selected segments of data receive the resize requests associated with their respective segments of data, and resize the segments of multimedia data. Encoder modules 18 and NRT service module 19 may resize the segments of data in a number of different ways. With respect to the real-time services, encoder modules 18 associated with the selected segments of data adjust the amount of motion information that is to be encoded to resize the segment of data. For example, encoder modules 18 may reduce the amount of motion information that is to be encoded. In other words, encoder modules 18 associated with the selected segments of data use a fewer number of bits to encode the motion information, thus reducing the size of the segment of data. In one aspect, encoder modules 18 associated with the selected segments of data may merge two or more motion vectors to reduce the amount of motion information to be encoded. As another example, encoder modules 18 may reselect an encoding mode for one or more blocks of pixels of at least one frame within the segment of data. As will be described in more detail below, reselecting the encoding mode for the blocks of pixels may have a similar effect to merging motion vectors. In another example, encoder modules 18 may increase the amount of motion information that is to be encoded when the resize request indicates that there is additional bandwidth available, e.g., again by reselecting an encoding mode for one or more blocks of pixels of a frame within the segment of data.

The encoding modes may, for example, comprise one or more prediction modes. In the context of H.264, for example, the encoding modes may comprise prediction modes, such as macroblock level inter-modes (e.g., Inter 16×16, Inter 16×8, Inter 8×16, and Inter 8×8) or 8×8 sub-partition modes (e.g., Inter 8×8, Inter 8×4, Inter 4×8 and Inter 4×4) as well as intra-predication modes for the same block sizes. Additionally, the encoding modes may also include forward, backward or bi-directional prediction mode selection for each of the inter-modes.

Encoder modules 18 associated with the selected segments of data may also adjust one or more encoding variables in addition to adjusting the amount of motion information to be encoded. In other words, encoder modules 18 may adjust one or more encoding variable and reduce the amount of motion information to be encoded to further resize the segments of data. For example, encoder modules 18 associated with the selected segments of data may adjust a bit rate at which the segments of data are re-encoded. As described above, encoder modules 18 associated with the selected segments of data may reduce the bit rate as specified in the resize request. Alternatively, encoder modules 18 may determine the reduced bit rate based on the number of bits allocated to the segment of data. As another example, encoder modules 18 associated with the selected segments of data may adjust quantization parameters (QPs) used to re-encode the segments of data or frame rate at which to encode the subsequent segments of data. Encoder modules 18 re-encode the segments of data or size-adjusted segments of data using the adjusted encoding variables. In this manner, encoder modules 18 associated with the selected segments of data resize the segments of data to satisfy the size or rate requirements specified in the resize requests.

Multiplex module 20 collects the encoded segments of data when multiplex module 20 is ready to generate the current superframe. Multiplex module 20 may, for example, send transfer requests to encoder modules 18 via the control channel. In response to the requests, encoder modules 18 send the encoded segments of multimedia data to multiplex module 20. Multiplex module 20 combines the flows of multimedia data to form a superframe and sends the superframe to transmitter 22 for transmission to one or more decoding devices via transmission channel 16. In this manner, multiplex module 20 manages bit allocation among the flows to fit all the segments of data into the fixed bandwidth channel 16 while preserving the highest overall quality of the plurality of flows of data.

The techniques of this disclosure may also be applied to non-real time services or a combination of real-time services and non-real time services. For example, multiplex module 20 may receive delivery requirements, such as priority and latency requirements, for non-real-time services from NRT service module 19, and analyze the delivery requirements of both the real-time and non-real-time services to determine whether the services fit within the fixed bandwidth channel. Multiplex module 20 may also require resizing of one or more of the non-real-time services. In this manner, multiplex module 20 may arbitrate between real-time services and non-real-time services. For purposes of illustration, however, this disclosure describes use of the encoding techniques in the context of real-time services.

The components in multimedia encoding device 12 are exemplary of those applicable to implement the techniques described herein. Multimedia encoding device 12, however, may include many other components, if desired. For example, multimedia encoding device may include more than one NRT service module 19. Moreover, the techniques of this disclosure are not necessarily limited to use in a system like that of FIG. 1, nor a broadcast system. The techniques may find application in any multimedia encoding environment in which encoding techniques are used to encode a plurality of flows of multimedia data for transmission over a transmission channel with limited bandwidth. The illustrated components of multimedia encoding device 12 may be integrated as part of an encoder/decoder (CODEC).

The components in multimedia encoding device 12 may be implemented as one or more processors, digital signal processors, application specific integrated circuits (ASICs), field programmable gate arrays (FPGAs), discrete logic, software, hardware, firmware, or any combinations thereof. Moreover, multimedia encoding device 12 may comply with a multimedia coding standard such as Moving Picture Experts Group (MPEG-4), one or more of the standards developed by the International Telecommunication Union Standardization Sector (ITU-T), e.g., H.263 or ITU-T H.264, or another coding standard. Depiction of different features as modules is intended to highlight different functional aspects of multimedia encoding device 12 and does not necessarily imply that such modules must be realized by separate hardware or software components. Rather, functionality associated with one or more modules may be integrated within common or separate hardware or software components. Thus, the disclosure should not be limited to the example of multimedia encoding device 12.

Figure 2:
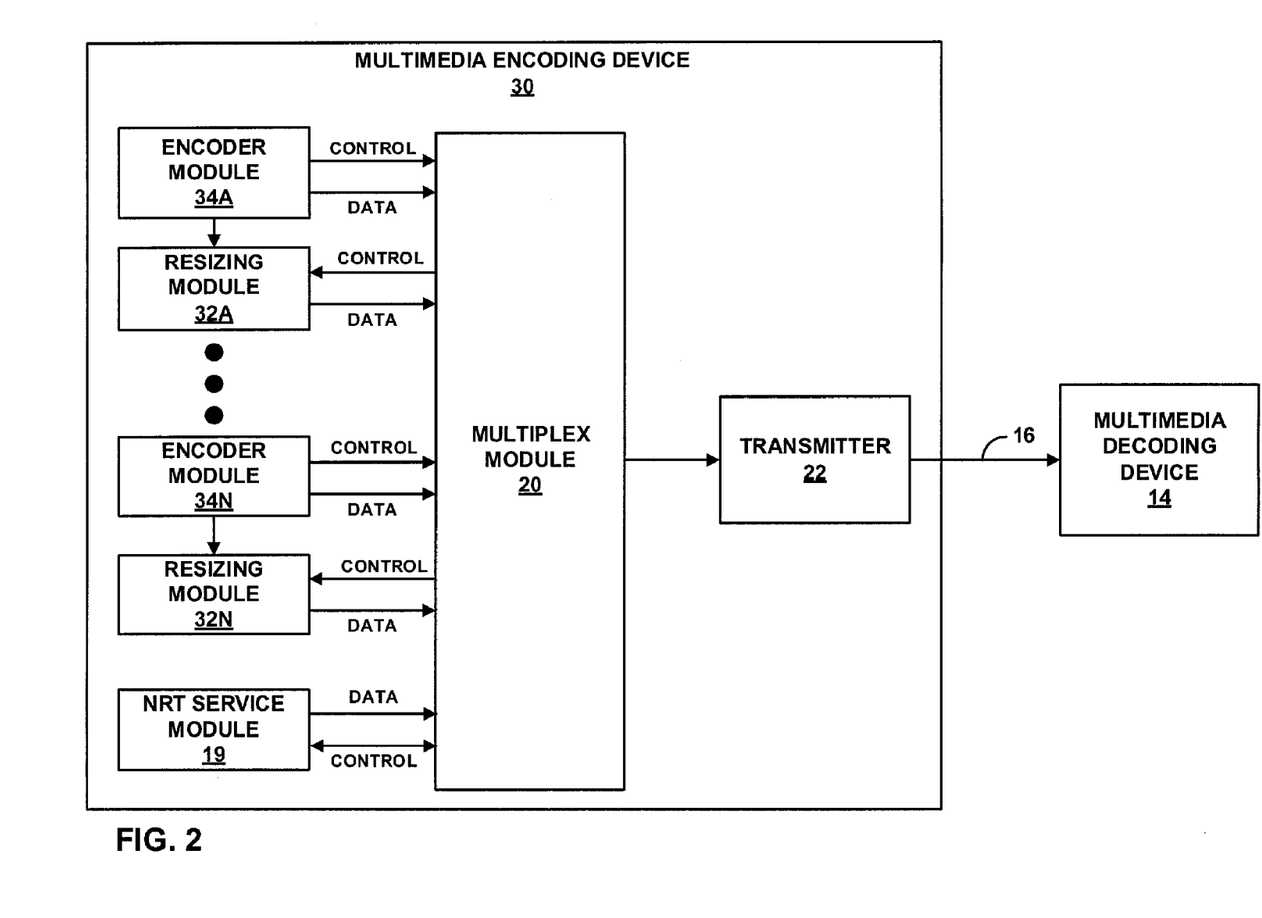
FIG. 2 is a block diagram illustrating another exemplary encoding and decoding system.

FIG. 2 is a block diagram illustrating another exemplary encoding and decoding system 30. Encoding and decoding system 30 conforms substantially to encoding and decoding system 12 of FIG. 1, but the resizing of selected segments of multimedia data is performed by resizing modules 32A-32N (collectively, "resizing modules 32") associated with the selected segments of data. Thus, the functionality of encoder modules 18 of FIG. 1 is divided between encoder modules 34A-34N (collectively, "encoder modules 34") and resizing modules 32. In other words, encoder modules 34 provide multiplex module 20 with delivery requirements, such as at least quality and rate information, associated with each of the segments of data for use in allocating the available bandwidth to the segments of data and selecting one or more of the segments of data to be resized when the allocation fails.

Resizing modules 32 receive requests from multiplex module 20 to resize the segments of data in accordance with the requirements specified by multiplex module 20 in the resize request. In particular, resizing modules 32 associated with the selected segments of data reduces the amount of motion information to be encoded, e.g., by merging one or more motion vectors in accordance with the techniques described herein, thus reducing the size of the segments of data. In addition to reducing the amount of motion information to be encoded resizing modules 32 may adjust one or more encoding variables, e.g., bit rate, frame rate or QP, to reduce the size of the segments of data.

Figure 3:
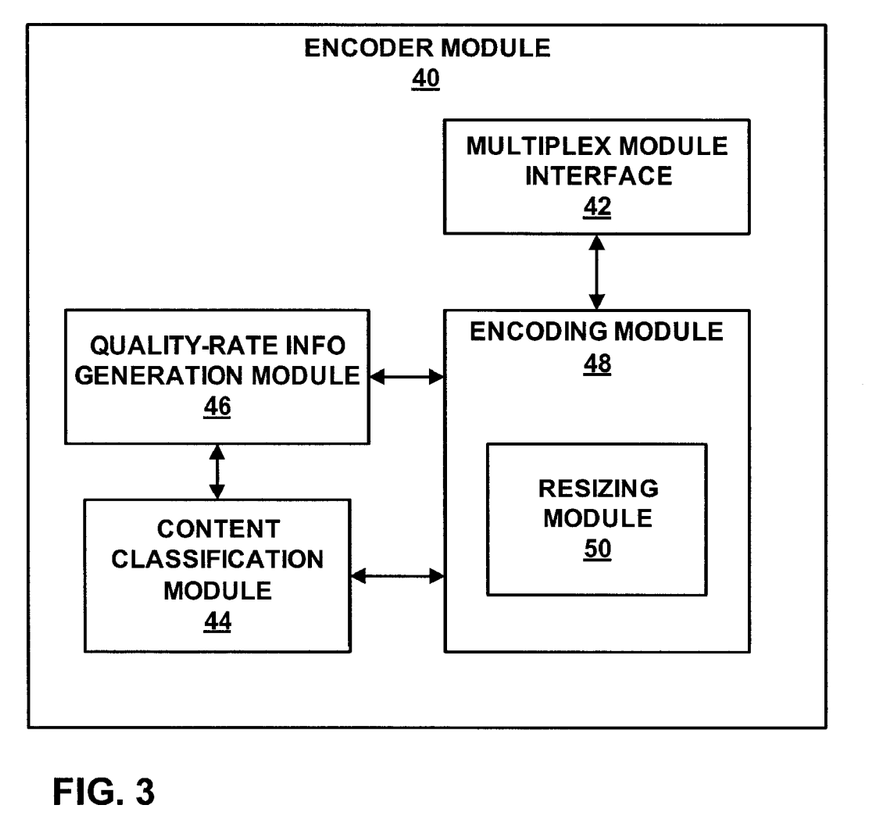
FIG. 3 is a block diagram illustrating an exemplary encoder module for use within a multimedia encoding device.

FIG. 3 is a block diagram illustrating an exemplary encoder module 40 for use within a multimedia encoding device, such as multimedia encoding device 12 of FIG. 1. Encoder module 40 may, for example, represent any one of encoder modules 18 of encoding device 12 of FIG. 1. Encoder module 40 includes a multiplex module interface 42, a content classification module 44, quality-rate information generation module 46, and an encoding module 48. Encoding module 48 further includes a resizing module 50 that resizes segments of data selected for resizing.

Encoder module 40 receives one or more flows of multimedia data from a source. Encoder module 40 may, for example, receive the flows of multimedia data from a memory or an image capture device coupled to encoder module 40. The flows of multimedia data may comprise live real-time video, audio, or video and audio flows to be coded and transmitted as a broadcast, or may comprise a pre-recorded and stored video, audio, or video and audio flows to be coded and transmitted as a broadcast or on-demand.

Encoder module 40 may be configured to operate at a constant bit rate or quality level. For example, in some cases, encoder module 40 attempts to maintain a constant perceived quality metric for the flows of data regardless of the content of the data. In other words, encoder module 40 may attempt to output every flow of data at a target quality level. To maintain a constant or similar perceived quality level, encoder module 40 may select different bit rates for segments of data with different content. To this end, content classification module 44 classifies the segments of data based on their content. Content classification module 44 may classify the segment of data based on the complexity (e.g., spatial complexity and/or temporal complexity) of the data of the segment. One exemplary content classification method is described in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein by reference. For example, content classification module 44 may classify motion information, e.g., motion vectors, into categories of "high," "medium," and "low" (on an x-axis) and classify texture information, e.g., contrast ratio values, into categories of "high," "medium," and "low," (on a y-axis) and the content classification is indicated at the point of intersection. This classification may be associated, for example, with a particular quality-rate curve.

Content classification module 44 associates the segments of data with one or more delivery requirements based on the classifications. Content classification module 44 may, for example, associate the segments of data with respective quality and rate information, such as quality-rate curves, quality-rate tables or the like. The quality-rate curves model a quality metric, such as peak signal to noise ratio (PSNR), as a function of a bit rate. Encoder module 40 may be configured with quality-rate curves that have been computed offline. Alternatively, quality-rate information generation module 46 may generate the quality-rate curves by, for example, modeling the quality-rate curves using a logarithmic function of the form:

$$Q = a^* \ln(r) + b,$$

where Q is the quality metric, r is the bit rate, and a and b are constants computed using a number of sample data points. Quality-rate information generation module 46 may maintain a plurality of quality-rate curves that represent quality-rate characteristics for flows of data with varying content. As an example, quality-rate information generation module 46 may maintain quality-rate curves for eight different classes associated with varying levels of motion and texture in the content of the flows. To account for the fact that constant PSNR does not necessarily mean constant perceived quality, quality-rate information generation module 46 may maintain quality-rate curves that use a quality metric other than PSNR, such as mean opinion scores (MOS). Alternatively, quality-rate information generation module 46 may adjust the quality-rate curves to account for the fact that constant PSNR does not necessarily mean constant perceived quality. For example, quality-rate information generation module 46 may adjust traditional quality-rate curves by an offset as described in detail in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein be reference.

Alternatively, quality-rate information generation module 46 may adjust the target quality level associated with each of the content curves by an offset. Segments of data that include high motion, high texture content may, for example, be encoded at a slightly lower quality with respect to the target quality level, whereas segments of data that include low motion, low texture content may be encoded at slightly higher quality with respect to the target quality level. Because each content class has its own adjusted quality level relative to the overall target quality level, encoder module 40 may normalize the quality level for each content class to measure the current quality level at encoder module 40. Encoder module 40 may achieve this normalization according to the linear equation below:

$$Q_{norm} = Q_r - Q_k,$$

where $Q_{norm}$ is the normalized quality level, $Q_r$ is the recorded quality level, and $Q_k$ is the adjustment offset in quality level for curve k. If quality normalization is not a linear function, rank determination may be performed after quality normalization.

In another example, content classification module 44 may associate the segments of data with pre-computed quality-rate tables that indicate one or more quality levels associated with the segments and sizes of the segment at each of the quality levels. To do so, content classification module 44 may associate the segment of data with a quality-rate curve, which corresponds to a particular one of the quality-rate tables. Quality-rate information generation module 46 may pre-compute the quality-rate curves, the adjusted quality-rate curves, or quality-rate tables, and store the pre-computed quality and rate information within a memory (not shown). Content classification module 44 may access the pre-computed quality and rate information when needed. Alternatively, quality-rate information generation module 46 may generate quality and rate information for the segments of data in real-time. For example, quality-rate information generation module 46 may create quality-rate tables based on the quality-rate curve associated with the segment of data.

Encoder module 40 sends the delivery requirements, e.g., the quality and rate information, associated with each of the segments of data to be included within the current superframe to multiplex module 20 (FIG. 1) via multiplex module interface 42. The quality and rate information assists multiplex module 20 in monitoring the size of the current superframe and determining which of the segments of data to resize, if resizing is required to fit the segments of data within the current superframe. Encoder module 40 may send the quality and rate information to multiplex module 20 in response to a request from multiplex module 20. As described above, the quality and rate information may comprise a quality-rate curve or quality-rate table associated with the segment of data.

If any of the segments of data associated with encoder module 40 need to be resized, multiplex module 20 sends a resize request to encoder module 40. In response to the resize request, resizing module 50 resizes the segment of multimedia data to reduce the size of the segment of data. In accordance with the techniques of this disclosure, resizing module 50 may adjust the amount of motion information to be encoded. For example, resizing module 50 may reduce the amount of motion information associated with the segments of data. As described above, each of the segments of data includes one or more frames of data. The frames of data may be partitioned into a plurality of blocks of pixels. Some blocks of pixels, often referred to as "macroblocks," comprise a grouping of sub-blocks of pixels. As an example, a 16×16 macroblock may comprise four 8×8 sub-blocks of pixels. The H.264 standard permits encoding of blocks with a variety of different sizes, e.g., 16×16, 16×8, 8×16, 8×8, 4×4, 8×4, and 4×8. Each of the sub-blocks may include at least one motion vector describing the motion field for that particular sub-block. To reduce the amount of motion information associated with the segments of data, and thus reduce the size of the segment of data, resizing module 50 may merge motion vectors of these sub-blocks to generate a single motion vector for the macroblock. Additionally, resizing module 50 may merge the motion vectors associated with the macroblocks to generate a single motion vector for the frame. Resizing module 50 thus reduces the number of motion vectors, resulting in a reduction in the amount of information to be encoded and thus the size of the segment of data.

In one aspect of this disclosure, resizing module 50 reselects an encoding mode for one or more blocks of pixels of at least one frame within the segment of data based on the new bit budget, i.e., based on the maximum number of bits or bit rate indicated in the resize request. As described above, resizing module 50 may reselect an encoding prediction mode based on the new bit budget. In the context of H.264, for example, resizing module 50 may reselect inter-prediction modes (e.g., Inter 16×16, Inter 16×8, Inter 8×16, and Inter 8×8) or 8×8 sub-partition prediction modes (e.g., Inter 8×8, Inter 8×4, Inter 4×8 and Inter 4×4) as well as intra-predication modes for one or more of the blocks of pixels of a frame within the segment of data. Additionally, the encoding modes may also include forward, backward or bi-directional prediction mode selection for each of the inter-modes. Alternatively or additionally, resizing module 50 may reselect a forward, backward or bidirectional prediction mode for each of the selected inter-modes. In other words, resizing module 50 redoes the mode decision for the macroblocks, sub-blocks or other partition of pixels.

In one aspect, resizing module 50 may reselect the encoding mode based on the information generated during a first pass encoding. In particular, encoding module 48 traverses each mode during a first pass encoding and generates motion vectors for each of the sub-blocks corresponding to each mode. In other words, encoding module 48 generates a number of different motion vectors for each sub-block, with each of the different motion vectors corresponding to a particular mode. During the first pass encoding, encoding module 48 selects a mode for the blocks of pixels and encodes the motion vectors for the selected modes. The mode information generated during the first pass encoding, i.e., the motion vectors associated with each of the modes is stored in a memory (not shown) for use by resizing module 50 during reselection.

In response to the resize request, resizing module 50 may reselect the mode for one or more of the sub-blocks according to the new bit budget specified by multiplex module in an attempt to select a better mode from the modes of the first pass. For example, resizing module 50 may reselect the mode to use Inter16×16 mode which has only one motion vector to replace the original Intra 16×8 mode which needs two motion vectors. In this manner, reselecting the encoding mode for one or more blocks of pixels has results in a similar outcome as merging motion information. Resizing module 50 retrieves the motion information generated for the newly selected mode, e.g., Inter 16×16 mode in the above example, and stored in the memory during the first pass encoding. In this manner, redoing the mode decision during the re-encode has a similar result to merging one or more motion vectors. Alternatively, resizing module 50 may generate motion information for the reselected mode using motion information associated with the old mode. For example, resizing module may merge the motion information of the Intra 16×8 mode to generate a motion vector for the new Inter 16×16 mode. Resizing module 50 may reselect the mode decision based on a quality-rate optimization rule. In other words, resizing module 50 may reselect the mode that has a small impact on the quality of the segment of data but a significant impact on bit rate saving. Since motion estimation is not necessary (although it may be performed) during the resizing, the computational complexity compared to the first pass is marginal. In this manner, resizing module 50 redoes the mode decision to select the motion vectors to merge together.

TABLE 1 includes results comparing the sizes of data re-encoded using the mode of the first pass and data re-encoded after redoing the mode decision for four segments of data. The different segments are identified as an animated segment, a music segment, a news segment and a sports segment. TABLE 1 illustrates a three types of coding results (column 1), a total bit rate, i.e., size (column 2), a base layer to enhancement layer ratio (column 3), a percentage of motion information in P frames (column 4), a base layer Luma PSNR (column 5) and an enhancement layer Luma PSNR (column 6). The three types of coding results are coding results for the first pass (first row of each segment), re-encoding results using the mode of the first pass (second row of each segment), and re-encoding results using the reselected mode decisions described above (third row of each segment). The quantization parameter for re-encoding comes from increasing the quantization parameter used in the first pass by six.

TABLE 1

|  | Total Rate | B:E | PMV % | PSNR Base | PSNR Enh. |
|---|---|---|---|---|---|
| Animated | | | | | |
| $1^{st}$ Pass | 269 | 1.1:1 | 53% | 31.2 | 35.4 |
| Re-encode with $1^{st}$ pass mode | 161 | 1.5:1 | 73% | 27.2 | 31.1 |
| Re-encode with MD | 135 | 1.1:1 | 57% | 27.2 | 30.9 |
| Music | | | | | |
| $1^{st}$ Pass | 281 | 1:1 | 51% | 35.1 | 36.6 |
| Re-encode with $1^{st}$ pass mode | 166 | 1.5:1 | 72% | 32.0 | 33.2 |
| Re-encode with MD | 128 | 1.2:1 | 57% | 32.0 | 32.8 |
| News | | | | | |
| $1^{st}$ Pass | 297 | 0.8:1 | 46% | 32.9 | 37.2 |
| Re-encode with $1^{st}$ pass mode | 182 | 1.1:1 | 78% | 28.9 | 33.0 |
| Re-encode with MD | 133 | 0.9:1 | 64% | 28.9 | 32.6 |
| Sports | | | | | |
| $1^{st}$ Pass | 301 | 1:1 | 60% | 31.6 | 34.5 |
| Re-encode with $1^{st}$ pass mode | 179 | 1.3:1 | 80% | 27.6 | 30.3 |
| Re-encode with MD | 145 | 1.1:1 | 67% | 27.5 | 29.9 |

As illustrated in the results of TABLE 1, re-encoding after redoing the mode decision (MD) can reduce the rate more significantly than re-encoding using the first pass mode. Looking at the base layer to enhancement layer ratio (B:E) it can be seen that it is hard to get a 1:1 when the re-encoding is performed with the first pass mode because of the size of motion information in P frames. Moreover, a larger base layer did not pay off for the base layer quality as shown in the base layer PSNR. Thus, the mode decided at the first pass is not optimal for a different bit budget. Therefore redoing the mode decision may significantly reduce the size of the segment of data.

In addition to reducing the amount of motion information, resizing module 50 may also adjust one or more encoding variables to reduce the size of the selected segment of data. The encoding variables may include a bit rate at which the selected segments of data are re-encoded, a QP at which the selected segments of data are re-encoded or the like. For example, resizing module 50 may re-encode the segment of data at a reduced bit rate to reduce the size of the selected segment of data. In some cases, the reduced bit rate may be specified within the resize request. Alternatively, rate control module 52 may select a reduced bit rate based on other information, such as a maximum size, specified in the resize request. Alternatively or additionally, resizing module 50 may make other adjustments to resize the segment of data such as re-encoding the segment of data using an adjusted quantization parameter.

In some cases, resizing of the segment of data may cause the quality level of the segment of data to fall below the target quality level. However, as described above, multiplex module 20 selects the segments to be re-encoded such that the overall quality of all the segments of data is preserved. If the quality level of the resized segment of data falls below a minimum quality level associated with encoder module 40, resizing module 50 may resize the segment of data such that the quality level of the resized segment of data is greater than or equal to the minimum quality level. For example, if a bit rate included within the resize request results in the segment of data being encoded at a quality level below the minimum quality level associated with encoder module 40, rate control module 52 may select a higher bit rate that results in the segment of data being encoded at the minimum quality level.

Encoder module 40 receives a request from multiplex module 20 to send the encoded segments of data to be included within the current superframe. In response to the request from multiplex module 20, encoder module 40 sends the encoded segments of data to multiplex module 20. As described above, encoder module 40 sends the segments of data that were not selected for resizing at the original bit rate and sends the segments of data that were selected for resizing at the reduced bit rate.

The components in encoder module 40 are exemplary of those applicable to implement the techniques described herein. Encoder module 40, however, may include many other components, if desired. The components in encoder module 40 may be implemented as one or more processors, digital signal processors, ASICs, FPGAs, discrete logic, software, hardware, firmware, or any combinations thereof. Moreover, encoder module 40 may comply with a multimedia coding standard such as MPEG-4, ITU-T H.263, ITU-T H.264, or another coding standard. Depiction of different features as modules is intended to highlight different functional aspects of encoder module 40 and does not necessarily imply that such modules must be realized by separate hardware or software components. Rather, functionality associated with one or more modules may be integrated within common or separate hardware or software components. Thus, the disclosure should not be limited to the example of encoder module 40.

Figure 4:
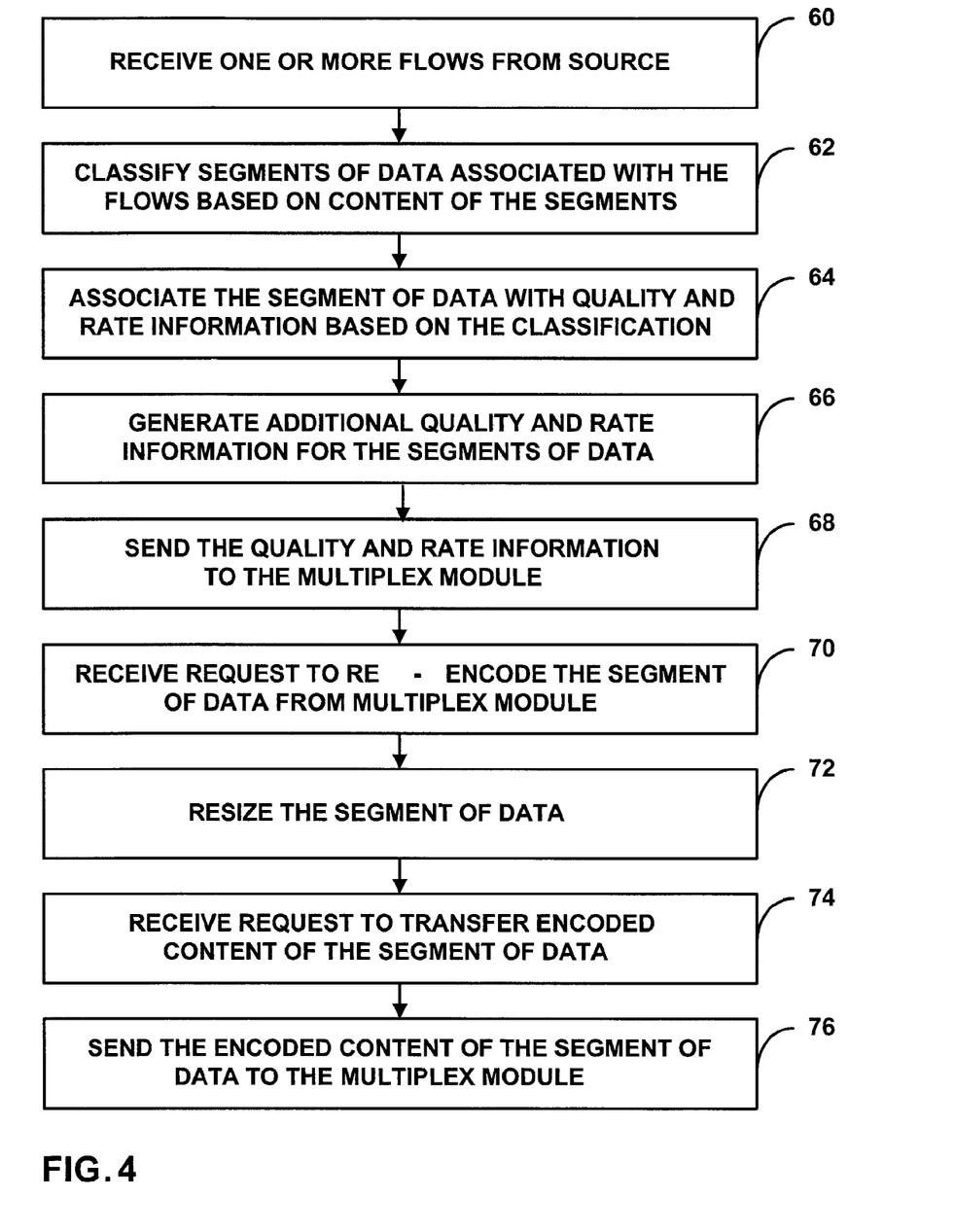
FIG. 4 is a flow diagram illustrating exemplary operation of an encoder module encoding multimedia data in accordance with the techniques of this disclosure.

FIG. 4 is a flow diagram illustrating exemplary operation of an encoder module, such as encoder module 40 of FIG. 3, encoding multimedia data in accordance with the techniques of this disclosure. Encoder module 40 receives one or more flows of multimedia data from a source (60). Encoder module 40 may, for example, receive the flows of multimedia data from a memory or an image capture device coupled to encoder module 40. The flows of multimedia data may comprise live real-time content, non real-time content, or a combination of real-time content and non real-time content.

Encoder module 40 classifies the segments of data based on their content (62). Content classification module 44 (FIG. 3) may, for example, classify the received segments of data based on the complexity (e.g., spatial complexity and/or temporal complexity) of the data of the segment. Content classification module 44 further associates the segments of data with quality and rate information based on the classification (64). As an example, content classification module 44 may associate the segments of data with one of a plurality of quality-rate curves. As described above, the quality-rate curves may be pre-computed and stored in a memory. As another example, content classification module 44 may associate the segments of data with one of a plurality of pre-computed quality-rate tables.

Encoder module 40 may generate additional quality and rate information for the segments of data (66). For example, quality and rate information generation module 46 may generate quality-rate tables for each of the segments of data. As describe above, the quality-rate tables indicate one or more quality levels associated with the segments of data and sizes of the segment of data at each of the quality levels.

Encoder module 40 sends the quality and rate information associated with the segment of data to a multiplex module 20 (68). Encoder module 40 may, for example, send the quality and rate information associated with the segment of data in response to a request from the multiplex module. Encoder module 40 may, for example, send a quality-rate curve and/or a quality-rate table associated with the segment of data. As described in detail above, the multiplex module uses the quality and rate information to monitor the size of a current superframe and to assist the multiplex module in determining which of the segments of data need to be resized.

If any of the segments of data associated with encoder module 40 need to be resized, encoder module 40 receives a resize request from the multiplex module 20 (70). The resize request from the multiplex module 20 may include a reduced bit rate or maximum size, e.g., in bits, for the segment of data. In response to the resize request, resizing module 50 resizes the encoded segment of data to reduce the size of the segment of data (72). In accordance with the techniques of this disclosure, encoder modules 18 associated with the selected segments of data reduce the amount of motion information that is to be encoded, thus reducing the size of the segments of data. For example, encoder modules 18 associated with the selected segments of data may merge two or more motion vectors. As will be described herein, encoder modules 18 may reselect an encoding mode of one or more blocks of pixels based on the new bit budget (i.e., size) to reduce the size of the motion information to be encoded. Reselecting the encoding mode has the same result as merging motion vectors together. Additionally, resizing module 50 may adjust one or more encoding variables to further reduce the size of the segment of data. Resizing module 50 may, for example, re-encode the segment of data at a reduced bit rate a higher QP to reduce the size of the segment of data.

Encoder module 40 receives a request from the multiplex module 20 to send the encoded content of the segments of data to be included within the current superframe (74). In response to the request from the multiplex module, encoder module 2600 sends the encoded content of the segment of data to multiplex module 20 (76). As described above, encoder module 40 sends segments of data that were not selected for resizing at the original size and sends segments of data that were selected for resizing at the reduced size.

Figure 5:
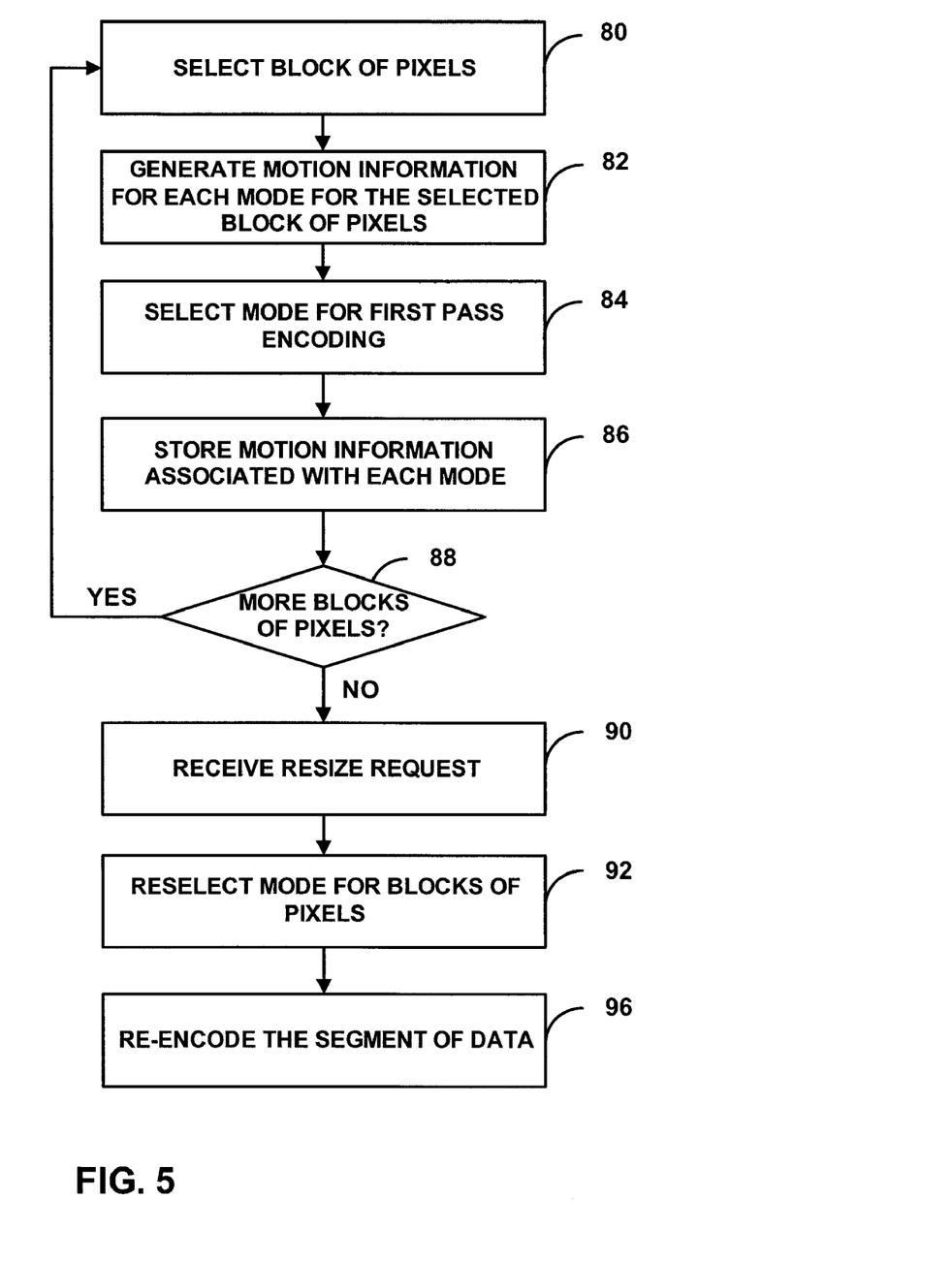
FIG. 5 is a flow diagram illustrating exemplary operation of an encoder module reducing the amount of motion information in accordance with one of the aspects of this disclosure.

FIG. 5 is a flow diagram illustrating exemplary operation of an encoder module, such as encoder module 40 (FIG. 3), reducing the amount of motion information in accordance with one of the aspects described herein. Initially, encoding module 48 selects a block of pixels of a frame within the segment of data (80). Encoding module 48 generates motion information for each mode for the selected block of pixels (82). For example, encoding module 48 may generate motion information for a forward prediction mode, a backward prediction mode and a bidirectional prediction mode. Encoding module 48 stores the motion information generated for each of the modes in a memory for use during resizing (86). Encoding module 48 selects one of the modes for the block of pixels to be used during a first pass encoding (84). Encoding module 48 may, for example, select the modes for the blocks of pixels during the first pass encoding based on a quality-rate optimization rule. In other words, encoding module 48 selects the modes to achieve a target quality level.

Encoding module 48 determines whether there are any more blocks of pixels within the frames of the segment of data (88). When there are additional blocks of pixels within the frames of the segment of data, encoding module 48 selects the next block of pixels, generates motion information for each mode for the selected block of pixels, stores the motion information generated for each of the modes in a memory and selects one of the modes for the block of pixels to be used during a first pass encoding. If there are no additional blocks of pixels, encoding module waits to receive a resize request for the segment of data (90).

Upon receiving a resize request for the segment of data, resizing module 50 reselects the mode for one or more of the blocks of pixels (92). Resizing module 50 may, for example, reselect the encoding mode to use Inter16×16 mode which has only one motion vector to replace the original Intra 16×8 mode which needs two motion vectors. Resizing module 50 retrieves the motion information generated for the Inter 16×16 mode and stored in the memory during the first pass encoding. Thus, redoing the mode decision during the re-encode has a similar result to merging one or more motion vectors. Resizing module 50 may reselect the mode decision based on a quality-rate optimization rule. In other words, resizing module 50 may reselect the mode that has a small impact on the quality of the segment of data but a significant impact on bit rate saving.

Resizing module 50 re-encodes the segment of data with the reduced motion information (96). In this manner, resizing module 50 resizes the segment of data by reducing the amount of motion information associated with the segment of data. As described above, resizing module 50 may additionally adjust one or more encoding variables to further resize the segment of data. For example, resizing module 50 may reduce a bit rate at which the segment of data is re-encoded or increase a quantization parameter used during re-encoding of the segment of data.

Based on the teachings described herein, one skilled in the art should appreciate that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers.

Combinations of the above should also be included within the scope of computer-readable media.

A computer program product, as disclosed herein, includes a computer-readable medium, as well as any materials associated with the computer-readable medium, including packaging materials within which the computer-readable medium is packaged. The code associated with a computer-readable medium of a computer program product may be executed by a computer, e.g., by one or more processors, such as one or more digital signal processors (DSPs), general purpose microprocessors, ASICs, FPGAs, or other equivalent integrated or discrete logic circuitry. In some aspects, the functionality described herein may be provided within dedicated software modules or hardware modules configured for encoding and decoding, or incorporated in a combined CODEC.

Various aspects have been described. These and other aspects are within the scope of the following claims.

What is claimed is:

1. A method for encoding a stream of digital multimedia data, the method comprising:
   determining, by a multiplex module, when an amount of available transmission channel resources for a current transmission frame is exceeded by a plurality of segments of data of the stream of digital multimedia data;
   generating, by the multiplex module, a request to resize at least one segment of data of the plurality of segments of data;
   receiving, at an encoder module, the request to resize the at least one segment of data associated with the stream of digital multimedia data for the current transmission frame, the request sent in response to a comparison between quality and rate information of the at least one segment of data and transmission channel resources with respect to the current transmission frame;
   resizing, at the encoder module, the at least one segment of data by adjusting an amount of motion information to be encoded with the at least one segment of data in response to the request;
   transmitting, from the encoder module to the multiplex module, the at least one resized segment of data and at least one unresized segment of data for the current transmission frame; and
   generating, by the multiplex module, the current transmission frame by collecting the at least one resized segment of data and the at least one unresized segment of data.

2. The method of claim 1, wherein resizing the segment of data by adjusting the amount of motion information to be encoded comprises resizing the segment of data by reducing the amount of motion information to be encoded.

3. The method of claim 2, wherein reducing the amount of motion information to be encoded comprises merging motion information associated with two or more blocks of pixels of at least one frame within the segment of data.

4. The method of claim 1, further comprising reselecting encoding modes for one or more blocks of pixels based on information generated during a first pass encoding of the segment of data.

5. The method of claim 4, wherein reselecting the modes for blocks of pixels comprises reselecting the encoding modes for one or more blocks of pixels that result in a smallest impact in quality of the segment of data and a highest reduction in bit rate of the segment of data.

6. The method of claim 4, wherein reselecting encoding modes for one or more blocks of pixels comprises reselecting one of intra-modes or inter-modes associated with the blocks of pixels.

7. The method of claim 4, wherein reselecting encoding modes for one or more blocks of pixels comprises reselecting one of a forward prediction mode, a backward prediction mode, and a bi-directional prediction mode for one or more inter-mode blocks of pixels.

8. The method of claim 1, wherein adjusting the amount of motion information to be encoded comprises increasing the amount of motion information to be encoded.

9. The method of claim 1, wherein resizing the segment of data further comprises adjusting one or more encoding variables in response to the request to further resize the segment of data.

10. The method of claim 9, wherein adjusting one or more encoding variables comprises adjusting one of a bit rate at which to encode the segment of data, a quantization parameter at which to encode the segment of data, and a frame rate at which to encode the segment of data.

11. The method of claim 1, wherein the segment of data comprises portions of real-time data.

12. An apparatus for encoding a stream of digital multimedia data, the apparatus comprising:
    a multiplex module that:
       determines when an amount of available transmission channel resources for a current transmission frame is exceeded by a plurality of segments of data of the stream of digital multimedia data; and
       generates a request to resize at least one segment of data of the plurality of segments of data;
    an interface that receives the request to resize the at least one segment of data of the segments of data associated with the stream of digital multimedia data for the current transmission frame, the request sent in response to a comparison between quality and rate information of the at least one segment of data and transmission channel resources with respect to the current transmission frame; and
    a resizing module that:
       resizes the at least one segment of data by adjusting an amount of motion information to be encoded with the at least one segment of data in response to the request; and
       transmits, to the multiplex module, the at least one resized segment of data and at least one unresized segment of data for the current transmission frame,
       wherein the multiplex module collects the at least one resized segment of data and the at least one unresized segment of data to generate the current transmission frame.

13. The apparatus of claim 12, wherein the resizing module resizes the segment of data to reduce the amount of motion information to be encoded.

14. The apparatus of claim 13, wherein the resizing module merges motion information associated with two or more blocks of pixels of at least one frame within the segment of data to reduce the amount of motion information.

15. The apparatus of claim 12, wherein the resizing module reselects encoding modes for one or more blocks of pixels based on information generated during a first pass encoding of the segment of data.

16. The apparatus of claim 15, wherein the resizing module reselects the encoding modes for one or more blocks of pixels that result in a smallest impact in quality of the segment of data and a highest reduction in bit rate of the segment of data.

17. The apparatus of claim 15, wherein the resizing module reselects one of intramodes or inter-modes associated with the blocks of pixels.

18. The apparatus of claim 15, wherein the resizing module reselects one of a forward prediction mode, a backward prediction mode, and a bi-directional prediction mode for one or more inter-mode blocks of pixels.

19. The apparatus of claim 12, wherein the resizing module increases the amount of motion information to be encoded.

20. The apparatus of claim 12, wherein the resizing module adjusts one or more encoding variables in response to the request to further resize the segment of data.

21. The apparatus of claim 20, wherein the resizing module adjusts one of a bit rate at which to encode the segment of data, a quantization parameter at which to encode the segment of data, and a frame rate at which to encode the segment of data.

22. The apparatus of claim 12, wherein the segment of data comprises portions of real-time data.

23. An apparatus for encoding a stream of digital multimedia data, the apparatus comprising:
  means for determining when an amount of available transmission channel resources for a current transmission frame is exceeded by a plurality of segments of data of the stream of digital multimedia data and for generating a request to resize at least one segment of data of the plurality of segments of data;
  means for receiving the request to resize the at least one segment of data associated with the stream of digital multimedia data for the current transmission frame, the request sent in response to a comparison between quality and rate information of the at least one segment of data and transmission channel resources with respect to the current transmission frame;
  means for resizing the at least one segment of data by adjusting an amount of motion information to be encoded with the at least one segment of data in response to the request;
  means for transmitting the at least one resized segment of data and at least one unresized segment of data; and
  means for generating the current transmission frame by collecting the at least one resized segment of data and the at least one unresized segment of data.

24. The apparatus of claim 23, wherein the resizing means reduces the amount of motion information to be encoded.

25. The apparatus of claim 24, wherein the resizing means merges motion information associated with two or more blocks of pixels of at least one frame within the segment of data.

26. The apparatus of claim 23, wherein the resizing means reselects modes for one or more blocks of pixels based on information generated during a first pass encoding of the segment of data.

27. The apparatus of claim 26, wherein the resizing means reselects the encoding modes for one or more blocks of pixels that result in a smallest impact in quality of the segment of data and a highest reduction in bit rate of the segment of data.

28. The apparatus of claim 26, wherein the resizing means reselects one of intramodes or inter-modes associated with the blocks of pixels.

29. The apparatus of claim 26, wherein the resizing means reselects one of a forward prediction mode, a backward prediction mode, and a bi-directional prediction mode for one or more inter-mode blocks of pixels.

30. The apparatus of claim 23, wherein the resizing means increases the amount of motion information to be encoded.

31. The apparatus of claim 23, wherein the resizing means adjusts one or more encoding variables in response to the request to further resize the segment of data.

32. The apparatus of claim 31, wherein the resizing means adjusts one of a bit rate at which to encode the segment of data, a frame rate at which to encode the segment of data, and a quantization parameter at which to encode the segment of data.

33. The apparatus of claim 23, wherein the segment of data comprises portions of real-time data.

34. A processor for processing digital video data, the processor being adapted to:
  determine when an amount of available transmission channel resources for a current transmission frame is exceeded by a plurality of segments of data of the digital video data and generate a request to resize at least one segment of data of the plurality of segments of data associated with the digital video data;
  receive the request to resize the at least one segment of data associated with the digital video data, the request sent in response to a comparison between quality and rate information of the at least one segment of data and transmission channel resources with respect to the current transmission frame;
  resize the at least one segment of data by adjusting an amount of motion information to be encoded with the at least one segment of data in response to the request; and
  generate the current transmission frame by collecting the at least one resized segment of data and at least one unresized segment of data of the plurality of segments of data.

35. The processor of claim 34, wherein the processor is adapted to reduce the amount of motion information to be encoded.

36. The processor of claim 35, wherein the processor is adapted to merge motion information associated with two or more blocks of pixels of at least one frame within the segment of data.

37. The processor of claim 34, wherein the processor is adapted to:
  reselect encoding modes for one or more blocks of pixels based on information generated during a first pass encoding of the segment of data.

38. The processor of claim 37, wherein the processor is adapted to reselect the encoding modes for one or more blocks of pixels that result in a smallest impact in quality of the segment of data and a highest reduction in bit rate of the segment of data.

39. The processor of claim 37, wherein the processor is adapted to reselect one of intra-modes or inter-modes associated with the blocks of pixels.

40. The processor of claim 37, wherein the processor is adapted to reselect one of a forward prediction mode, a backward prediction mode, and a bi-directional prediction mode for one or more inter-mode blocks of pixels.

41. The processor of claim 34, wherein the processor is adapted to increase the amount of motion information to be encoded.

42. The processor of claim 34, wherein the processor is adapted to adjust one or more encoding variables in response to the request to further resize the segment of data.

43. The processor of claim 42, wherein the processor is adapted to adjust one of a bit rate at which to encode the segment of data, a frame rate at which to encode the segment of data and a quantization parameter at which to encode the segment of data.

44. A non-transitory computer-readable medium for processing digital video data comprising instructions that cause at least one computer to:
  determine when an amount of available transmission channel resources for a current transmission frame is exceeded by a plurality of segments of data of the digital video data and generate a request to resize at least one segment of data associated with the digital video data;
  receive the request to resize the at least one segment of data associated with the digital video data for the current transmission frame, the request sent in response to a comparison between quality and rate information of the at least one segment of data and transmission channel resources with respect to the current transmission frame;

resize the at least one segment of data by adjusting an amount of motion information to be encoded with the segment of data in response to the request; and generate the current transmission frame by collecting the at least one resized segment of data and at least one unresized segment of data of the plurality of segments of data.

45. The non-transitory computer-readable medium of claim 44, wherein the instructions that cause the computer to resize the segment of data by adjusting the amount of motion information to be encoded comprise instructions to cause the computer to reduce the amount of motion information to be encoded.

46. The non-transitory computer-readable medium of claim 45, wherein the instructions that cause the computer to reduce the amount of motion information to be encoded comprise instructions that cause the computer to merge motion information associated with two or more blocks of pixels of at least one frame within the segment of data.

47. The non-transitory computer-readable medium of claim 44, wherein the computer readable medium further comprises instructions that cause the computer to reselect encoding modes for one or more blocks of pixels based on information generated during a first pass encoding of the segment of data.

48. The non-transitory computer-readable medium of claim 47, wherein the instructions that cause the computer to reselect encoding modes comprise instructions that cause the computer to reselect the encoding modes for one or more blocks of pixels that result in a smallest impact in quality of the segment of data and a highest reduction in bit rate of the segment of data.

49. The non-transitory computer-readable medium of claim 47, wherein the instructions that cause the computer to reselect encoding modes comprise instructions that cause the computer to reselect one of intra-modes or intermodes associated with the blocks of pixels.

50. The non-transitory computer-readable medium of claim 47, wherein the instructions that cause the computer to reselect encoding modes comprise instructions that cause the computer to reselect one of a forward prediction mode, a backward prediction mode, and a bi-directional prediction mode for one or more intermode blocks of pixels.

51. The non-transitory computer-readable medium of claim 44, wherein the instructions that cause the computer to adjust the amount of motion information to be encoded comprise instructions that cause the computer to increase the amount of motion information to be encoded.

52. The non-transitory computer-readable medium of claim 44, wherein the computer readable medium further comprises instructions that cause the computer to adjust one or more encoding variables in response to the request to further resize the segment of data.

53. The non-transitory computer-readable medium of claim 52, wherein the instructions that cause the computer to adjust one or more encoding variables comprise instructions that cause the computer to adjust one of a bit rate at which to encode the segment of data, a frame rate at which to encode the segment of data and a quantization parameter at which to encode the segment of data.

* * * * *